United States Patent [19]

Crockett

[11] Patent Number: 4,474,079
[45] Date of Patent: Oct. 2, 1984

[54] CONTINUOUSLY VARIABLE TURBO MECHANICAL TRANSMISSION

[76] Inventor: Samuel J. Crockett, Rte. 2, Box 97, Brooksville, Fla. 33512

[21] Appl. No.: 426,454

[22] Filed: Sep. 29, 1982

[51] Int. Cl.³ .................. F16H 47/08; F16H 37/06
[52] U.S. Cl. ................................. 74/688; 74/682; 74/705; 74/720
[58] Field of Search .............. 74/681, 682, 688, 705, 74/720

[56] References Cited

U.S. PATENT DOCUMENTS

| 2,147,528 | 2/1939 | Fottinger | 74/688 |
| 2,674,137 | 4/1954 | Place | 74/688 |
| 2,704,468 | 3/1955 | Horton et al. | 74/688 |
| 2,834,228 | 5/1958 | Place | 74/688 |
| 3,241,400 | 3/1966 | Martin | 74/688 X |

FOREIGN PATENT DOCUMENTS

| 0014139 | 8/1980 | European Pat. Off. | 74/688 |
| 732945 | 2/1943 | Fed. Rep. of Germany | 74/688 |
| 739402 | 8/1943 | Fed. Rep. of Germany | 74/688 |
| 805729 | 11/1936 | France | 74/688 |
| 1334021 | 12/1963 | France | 74/688 |
| 2426190 | 1/1980 | France | 74/688 |

OTHER PUBLICATIONS

"Cheap and Simple Gearbox ... ", The Engineer, p. 46. vol. 235, No. 6079, 9/72.

Primary Examiner—Allan D. Herrmann
Assistant Examiner—D. Wright
Attorney, Agent, or Firm—Dowell & Dowell

[57] ABSTRACT

A power transmission for motor vehicles including two parallel mutually cooperative and inner acting power input drive trains connected between a motor vehicle power source and the vehicle drive shaft and a reversely directed torque compensating drive train operatively connected between the parallel power input drive trains, which transmission includes a first mechanical drive train which is connected to the motor vehicle power source and the vehicle drive shaft by differential torque transfer gearing which transmits torque in a reverse but parallel direction with respect to the drive shaft to a fluid torque converter having a turbine connected to a secondary hollow drive shaft. The torque converter dissipates the power source input torque at low engine RPM and functions to provide additional input to the mechanical drive train at higher engine speeds to thereby prevent the application of torque to the vehicle drive shaft at low engine idling speeds but which permits torque to be directed to the drive shaft automatically as higher engine speeds are achieved.

8 Claims, 10 Drawing Figures

CONTINUOUSLY VARIABLE TURBO MECHANICAL TRANSMISSION

BACKGROUND OF THE INVENTION

1. Field of the Invention

This invention is generally directed to power transmissions for automotive vehicles and particularly to a continuously variable turbo mechanical transmission having a primary input drive train disposed between a vehicle power source and a vehicle drive shaft and a fluid torque converter supplemental drive train cooperatively engaged to transmit drive torque to the primary drive train at engine speeds in excess of normal idling speeds, and in which the fluid torque converter is mounted along a portion of a reversely directed torque compensating drive train to thereby absorb engine torque being transmitted towards the vehicle drive shaft from the primary drive train at low engine speeds.

2. History of the Prior Art

In the present day automatic transmissions for automotive vehicles torque from the vehicle power source to the vehicle drive shaft and hence to the drive wheels of the vehicle is regulated through a set of automatically shiftable gears which are engaged or disengaged upon the detection of various driving and loading conditions. Such automatically shiftable gears are regulated by vacuum operated modulaters, drive shaft governors or other throttle controls to vary the torque ratio between the power input and output shafts depending upon the amount of torque being introduced into the transmission. In the operation of such automatic transmissions, as torque is increased from the engine drive input, the transmission responds at various predetermined conditions to alter the gear ratio between the engine input and the vehicle drive shaft so as to approach a theoretical one to one relationship between the input and output of the vehicle drive train.

A problem frequently encountered with automatic transmission is that at low engine idling speed the torque generated by the power source is imparted to the vehicle drive shaft resulting in a condition known as "creep". Under such conditions, the automotive vehicle operator must apply the brake to the vehicle while stopped at stoplights, parking areas, intersections and the like. In the event the vehicle brake is released prior to acceleration, the torque developed at the idling speed is sufficient to be transmitted through the transmission to the vehicle drive shaft and thus the vehicle is urged into a driving mode even though the accelerator is not engaged.

Various prior art transmissions have been developed to overcome problems associated with standard transmissions by providing means for absorbing engine input torque until vehicle acceleration is desired. Such transmissions may incorporate a combination of fluid torque converters together with mechanical gearing systems. Some examples of the prior art include U.S. Pat. Nos. 2,675,137 to Place; 2,704,468 to Horton et al.; and 2,834,228 to Place.

SUMMARY OF THE INVENTION

A continuously variable turbo mechanical transmission having a primary power input shaft which is connected to the engine output and which includes a series of differential and sun gears which function to provide an increased torque ratio over the engine output and which are connected through a torque dividing or splitting differential to the vehicle drive shaft. The transmission further includes a secondary but parallel drive train controlled by a fluid torque converter which is connected in driving engagement to a reverse power input disposed between the torque splitting differential connecting the primary drive train to the vehicle drive shaft. The secondary drive train functions to absorb torque transmitted thereto at low engine RPMs to thereby prevent vehicle creep. The fluid torque converter is drivingly connected to supply increased torque through the secondary parallel drive shaft which cooperatively engages through a second differential torque compensating gear to the sun gear housing of the primary drive shaft to thereby increase the amount of torque transmitted to the vehicle drive shaft when engine operating speeds above idling are achieved.

It is the primary object of this invention to provide a turbo mechanical means for accomplishing engine torque retardation to prevent vehicle creep or drifting by absoring engine torque normally transmitted to the vehicle drive shaft at low or idling engine speeds.

It is another object of this invention to provide an automatic transmission having parallel drive trains in which a torque converter is included in the secondary drive train which torque converter is freely journaled around the primary input shaft and is not driving at low engine idling speeds, and, therefore, absorbs energy which would otherwise be transmitted to the vehicle drive shaft causing creep at low engine speeds.

It is a further object of this invention to provide an automatic transmission including parallel drive trains in which a torque converter is mounted in the secondary drive train so as to absorb energy transmitted between the engine and the vehicle drive shaft at low engine speeds but which functions at higher engine speeds to impart drive energy to the primary or parallel drive shaft so that the output therefrom is mechanically combined and transmitted to the vehicle drive shaft at higher engine speeds.

It is yet another object of this invention to provide a transmission for automotive vehicles wherein engine power is absorbed within the transmission at low engine speeds but which power is connected to the vehicle drive shaft when the engine is accelerated above normal idling speeds.

DESCRIPTION OF PREFERRED EMBODIMENTS

Figure 1:
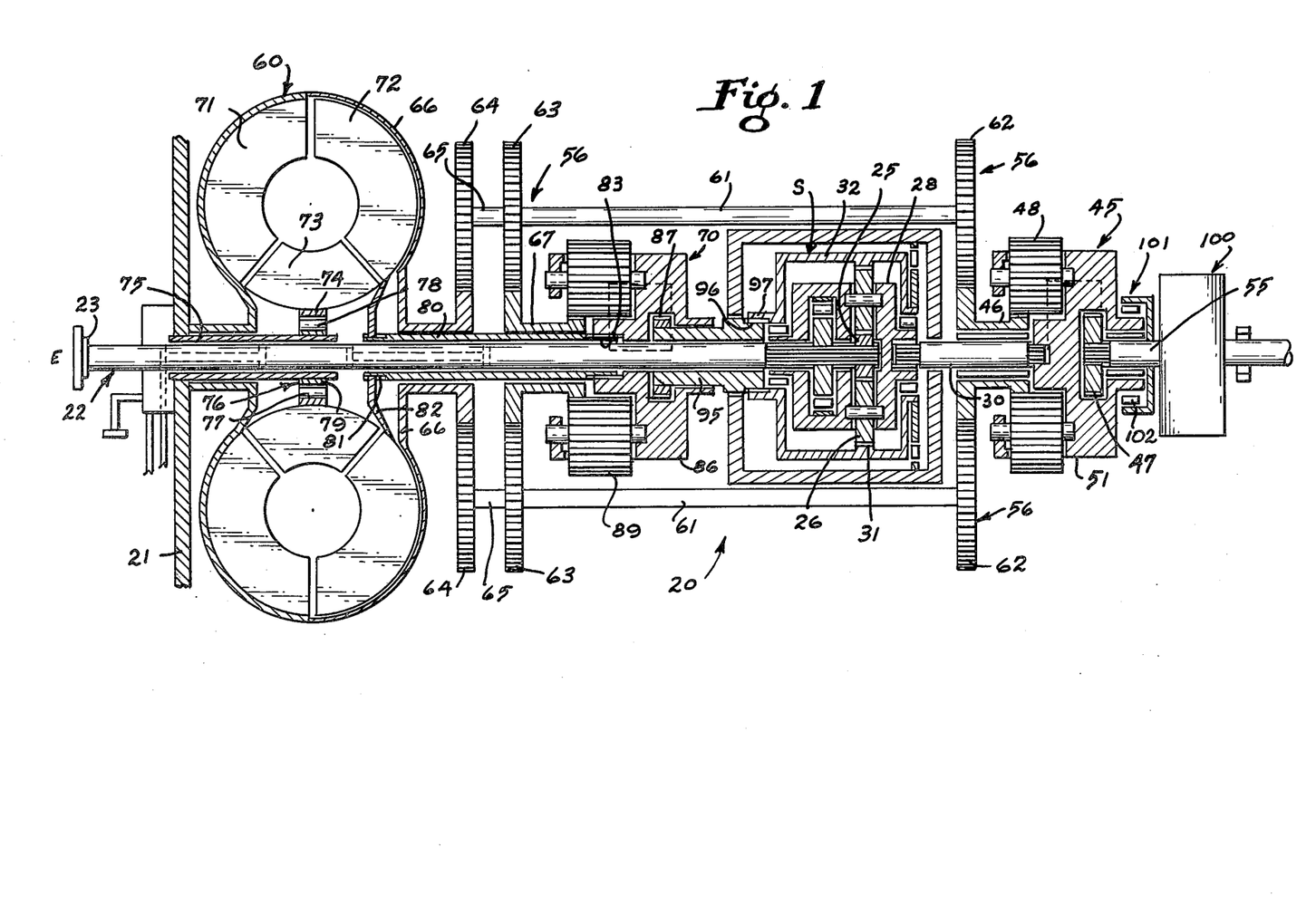
FIG. 1 is a diagrammatical cross section of the vehicle transmission of the present invention as it is shown connected between a source of power and a vehicle drive shaft.

With continued reference to the drawings, the transmission 20 of the present invention is mounted within a housing 21 which is partially shown in FIG. 1. The primary or main power input shaft 22 of the transmission extends inwardly of the transmission housing 21 and is drivingly connected at one end 23 to a sutiable prime mover or power source, such as an internal combustion engine, which is generally designated as "E". The other end 24 of the primary input shaft is splined and meshes with the sun gear 25 of a sun gear assembly S.

Figure 2:
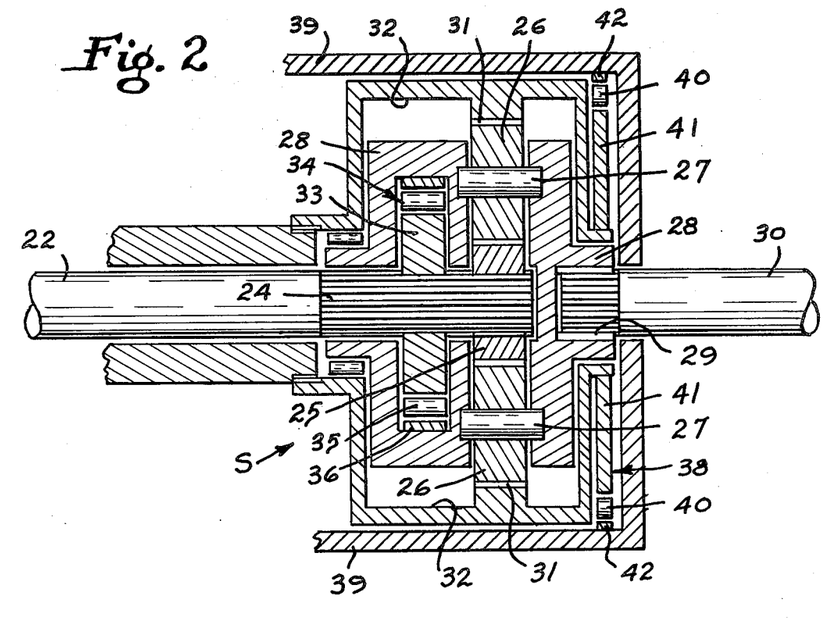
FIG. 2 is an enlarged cross-sectional view of the sun gear assembly S of FIG. 1.

The sun gear 25 drives a pair of planetary pinion gears 26 which are mounted on axles 27 which axles are carried by a pinion carrier 28 that is splined at 29 to an intermediate or extended input shaft 30. The planetary pinions 26 are meshed with a ring gear 31 which is disposed around the inner periphery of a rotatable housing 32. A locking cam 33 is also carried by the splined end 24 of the primary power input shaft 22 and engages a roller clutch 34 having roller elements 35 which abut an outer race 36 carried by a portion of the pinion carrier 28.

A one-way roller clutch 38 is also placed between the rotatable housing 32 and a fixed housing 39. The roller clutch 38 includes roller members 40 which are engaged between a spring loaded annular cam member 41 and an outer race 42. The one-way roller clutch 38 serves to prevent the rotatable housing 32 from being rotated in a counterclockwise direction when viewed from the left as shown in FIG. 1, as will be described in greater detail hereinafter. If the housing 32 was not locked against rotation in a counterclockwise direction, the reaction force of the sun gear 25 driving the planetary pinions 26 would urge the ring gear 31 and housing 32 in a counterclockwise direction, thereby causing a loss of the input torque which would normally be derived from the primary power input shaft 22 to drive the pinion carrier 28, thereby powering the intermediate power input shaft 30.

Figure 3:
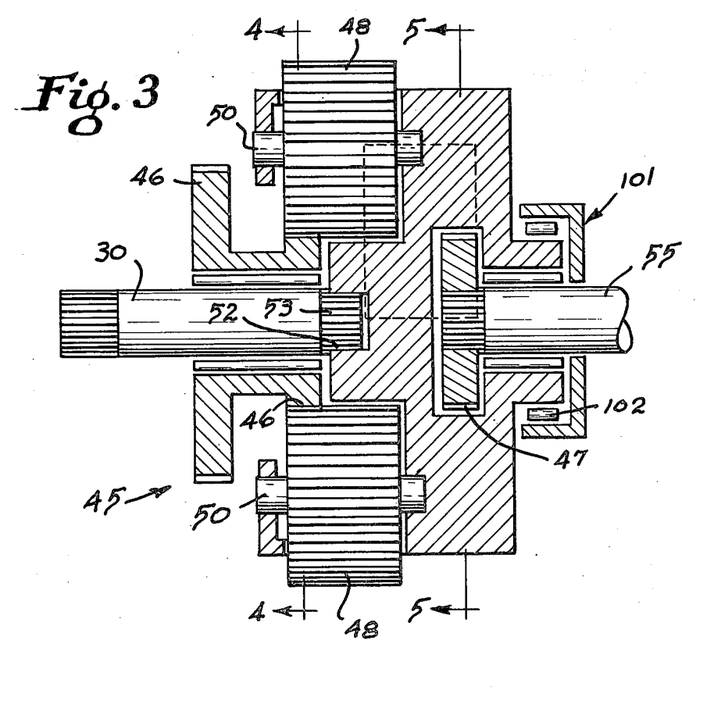
FIG. 3 is an enlarged cross-sectional view of the differential torque splitting assembly 45 of FIG. 1.

With particular reference to FIG. 3 the power or torque applied from the power source E through the primary input shaft 22, sun gear 25, pinion gears 26, and pinion carrier 28 to the intermediate power input shaft 30 is applied to a gearing assembly or torque splitting compensator 45 having differential capabilities. The torque compensator 45 includes reverse power output gear 46 and a direct output drive gear 47 which are interconnected by two pairs of overlapping pinion gears 48 and 49. Pinion gears 48 are mounted on axles 50 carried by a rotatable housing 51 which is splined at one end 52 to the end 53 of the intermediate power input shaft 30. Pinion gears 49 are similarly mounted on axles 54 which are also carried by the rotatable housing 51. The pinions 49 serve to transmit torque from the intermediate power input shaft through the housing 51 to the direct output drive gear 47 which is splined to the vehicle drive shaft 55.

As the torque compensator is utilized to transmit power both directly to the vehicle drive shaft 55 as well as to a secondary reverse power output gear 46, the pinions 48 are meshed with the reverse power output gear 46 which is rotatable carried by the end of the intermediate power input shaft 30. The pinions 48 and 49 provide a differential capability between the reverse power output gear 46 and the direct output drive gear 47.

From the foregoing it is evident that the housing 51 is free to rotate about the direct output drive gear 47 when a load sufficient to restrict rotation of the vehicle drive shaft is imparted to the direct output drive gear 47. When the power from the engine E is not sufficient to overcome the restrictive load placed on the vehicle drive shaft 55 the power transmitted through the primary and intermediate power input shafts will be directed to a secondary power input or torque compensating assembly 56 through reverse power output gear 46 as the pinions 48 and 49 and housing 51 revolve about the fixed direct output drive gear 47. When the reverse power output gear 46 is being driven and the direct output drive gear is stationary, all the power from the engine E will be directed to the secondary drive input assembly without torque being conveyed to the vehicle drive shaft 55.

With further reference to FIG. 1, power transmitted to the reverse power output gear 46 is conveyed to a fluid torque converter 60 which is disposed about the primary power input shaft adjacent the front end of the transmission assembly 20. The reverse power output gear drives a pair of countershafts 61 through driven gears 62 fixedly secured to one end of each countershaft.

A pair of spaced driving gears 63 and 64 are secured adjacent the other end 65 of each countershaft 61. Driving gears 64 are meshed with the rotatable housing 66 of the torque converter 60 while driving gears 63 are meshed with an annular gear 67 which drivingly engages a second differential torque compensating assembly 70.

The fluid torque converter 60 differs from converters used in most present automatic transmissions in that it is neither bolted directly to the engine nor directly driven by the engine. The torque converter 60 includes impeller vanes 71 oriented adjacent the front of the transmission housing 21 and carried by the rotatable housing 66 of the torque converter, opposing turbine vanes 72 and intermediate stator vanes 73. The stator vanes 73 are carried by a stator wheel 74 which is rotatable supported about a hollow stator support tube 75. The stator tube 75 is disposed round the primary input drive shaft 22 and extends through the front wall of the transmission housing. A roller clutch assembly 76 is disposed between the stator wheel and the stator support tube and includes an outer race 77 mounted to the stator wheel, rollers 78 and a cam assembly 79 which is attached to the stator support tube 75.

Figure 7:
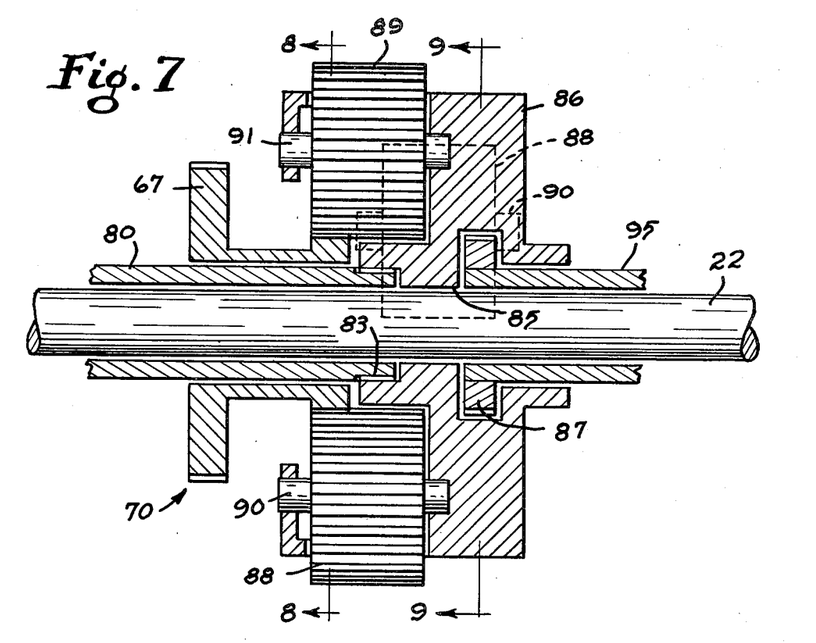
FIG. 7 is an enlarged cross-sectional view of the second torque compensating assembly 70 of FIG. 1.
Figure 8:
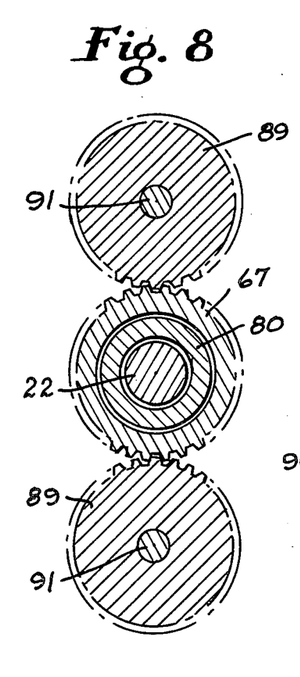
FIG. 8 is a section taken along lines 8—8 of FIG. 7.
Figure 9:
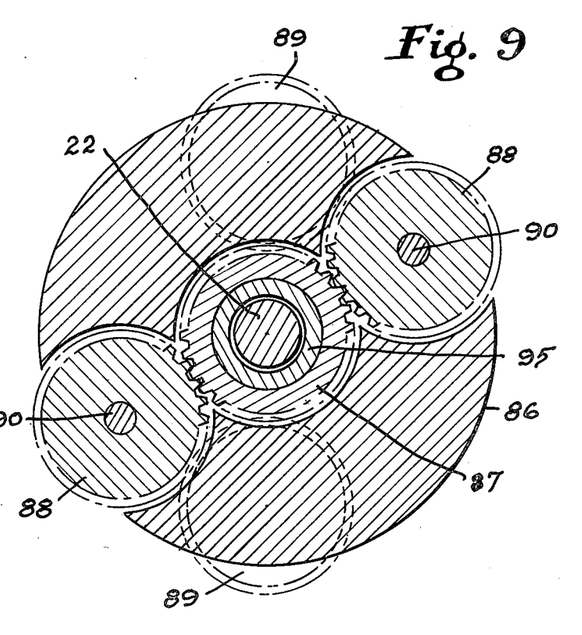
FIG. 9 is a section taken along lines 9—9 of FIG. 7.
Figure 10:
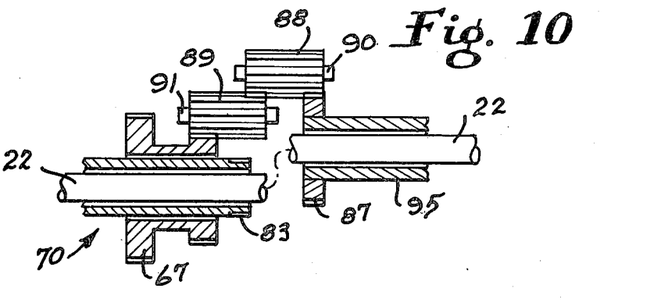
FIG. 10 is a reduced schematic illustration showing the gearing associated with the torque compensator shown in FIG. 7.

The fluid torque converter has a hollow center and is journaled about the input shaft 22. A secondary hollow power input shaft 80 is splined at one end 81 to extensions 82 of the turbine vanes 72 so as to be in driven engagement with the turbine vanes. The other end 83 of the secondary power input shaft is splined and meshes with the second torque compensator 70, as shown in FIG. 7. The second torque compensator has a hollow opening 85 through which the main power input shaft 22 is disposed. The compensator 70 further includes a rotatable housing 86 which is drivingly connected between the secondary or turbine power input shaft 80, an output drive gear 87 and the input annular gear 67. The output gear 87 and input gear 67 are interconnected by two pair of overlapping pinions 88 and 89. Pinions 88 are carried on axles 90 carried by the rotating housing 86 so as to be in meshed engagement between output gear 87 and the overlapping pinions 89. Pinions 89 are likewise carried on axles 91 journaled within the housing 86 and are in meshed engagement with the annular input gear 67 and the adjacent pinions 88.

Power being conveyed through the secondary power or turbine drive shaft 80 is conveyed through the rotatable housing 86 to the output gear 87 to a secondary hollow extension power input shaft 95. With continued reference to FIG. 1, the remote end 96 of the secondary extension power input shaft is mounted in meshed engagement with a flanged portion 97 of the ring gear housing 32. Thereby, torque being conveyed through the extension power input shaft is imparted to the ring gear housing 32 and is in turn transmitted through the ring gear 31 and planetary pinion gears 26 to the rotatable pinion carrier 28 and hence combined with the primary power input to the intermediate power input shaft 30.

Also shown in FIG. 1 is a compound planetary gear assembly 100 which may be of a conventional design and which is used for the purpose of selecting various drive ranges in which the vehicle may be operated, i.e., high, medium or low range, regardless of the revolutions per minute being developed by the power source E. The planetary gear assembly is also used for providing greater retardation of the drive train on steep grades than would otherwise be available in a direct drive situation alone with the gear assembly engaged to mechanically connect the drive shaft 55 therethrough to the vehicle drive wheels.

In the operation of the transmission of the present invention the input torque is routed in two parallel drive paths and one reversible power compensating path. Generally, the engine input torque follows the primary power input shaft 22 through the central portion of the transmission by way of sun gear assembly S to the torque compensator and splitting unit 45. In the event torque supplied to the direct output drive gear 47 is insufficient to overcome the load placed on the vehicle drive shaft 55, the housing 51 of the torque compensator 45 will rotate in a freewheel manner about the direct output drive gear 47 while the torque is directed in a reverse path through reverse power output gear 46 and countershaft 61 to the fluid torque converter 60. In the fluid torque converter 60 kinetic energy causes the turbine to rotate thereby imparting rotational torque on the hollow turbine or secondary input drive shaft 80. Torque supplied to the secondary parallel hollow drive shaft 80 is conveyed through the second torque compensator unit 70 and the extension secondary power input drive shaft 95 and drives the ring gear housing 32 and ring gear 31.

As long as there is a sufficient load to resist rotation of the drive shaft 55, as would normally occur at low idling speeds the torque transmitted from the power source E will continue to be redirected through the counter power shafts 61 to drive the fluid torque converter 60 and secondary parallel power input 80. In order to drive the secondary hollow input drive shaft 80, sufficient torque must be applied through the fluid torque converter housing 66 to the impeller vanes to establish a fluid velocity within the torque converter to initiate rotation of the turbine vanes 72. Therefore, when the power source E is rotating at idling speeds or below, the energy being conveyed to the torque converter 60 will be absorbed and thus the torque which would otherwise tend to drive the vehicle drive shaft through the direct output drive gear will be relieved or dissipated.

In the present invention, the fluid torque converter 60 is capable of doubling the engine torque supplied to it by the countershafts 61. With further reference to FIG. 1, the torque supplied from the fluid torque converter along the hollow secondary power input shaft 80 is further compounded by way of the pinion gears carried by the rotatable housing 86 of torque compensator 70. The primary purpose of the torque converter is to drive the ring gear 31 associated with the ring gear housing 32, and thereby drive housing 32 in a clockwise direction when viewed from the left of FIG. 1. As the housing 32 begins to rotate, the pinions 26 are moved about the sun gear 25 until such time as the rotational speed of the pinions equals that of the sun gear. Due to the increase in torque ratio developed through the fluid torque converter and the second torque compensator assembly 70, the planetary pinions 26 will quickly attain the same operating speed as the sun gear 25 which is being driven directly by the primary power input shaft 22. As torque is being supplied to the intermediate power input shaft 30 by both the primary or first and secondary parallel power input systems, the rotational energy conveyed to the torque splitting compensator 45 is likewise increased.

As shown in the preferred embodiment, the diameters of the sun gear 25 and planetary pinion gears 26 are such as to create a ratio of four to one between the torque supplied to the sun gear by the primary power input shaft 22 and the torque being transmitted to the intermediate power input shaft 30, and hence to the torque compensator 45. Thus, if the engine is idling at 800 RPM the sun gear 10 would be rotated by the primary power input shaft 22 at 800 RPM. However, the rotatable housing 51 of the torque compensator unit 45 will be driven at only one-fourth the rate, or 200 RPM.

Figure 4:
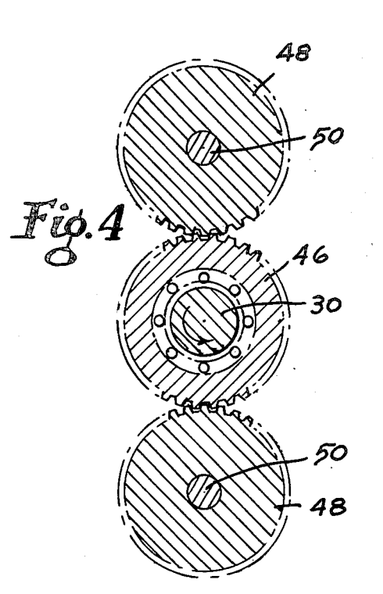
FIG. 4 is a section taken along lines 4—4 of FIG. 3.
Figure 5:
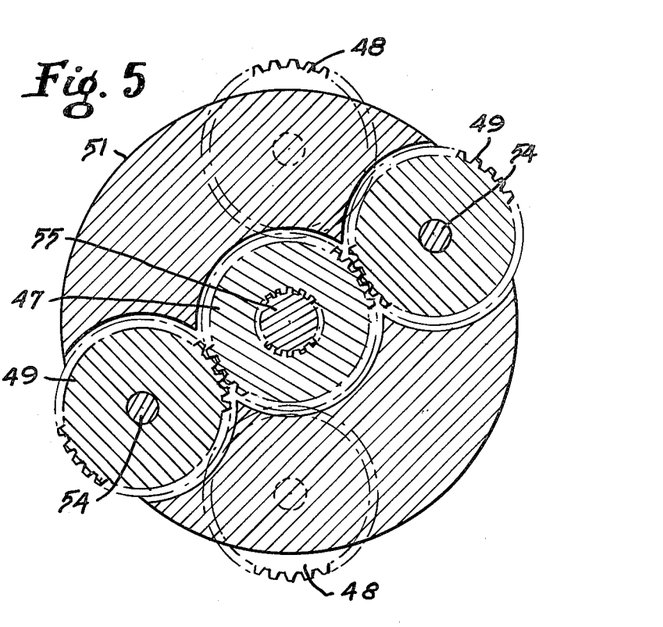
FIG. 5 is a section taken along lines 5—5 of FIG. 3.
Figure 6:
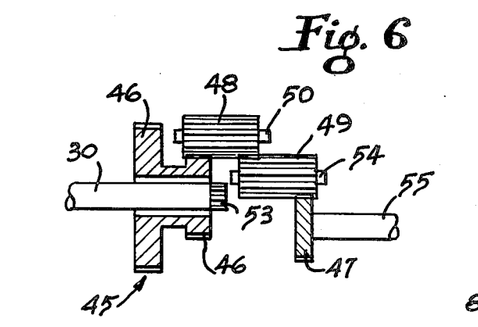
FIG. 6 is a reduced schematic cross-sectional illustration showing the gearing arrangement of the torque splitting assembly of FIG. 3.

With particular reference to FIGS. 4 and 5, it is noted that the diameters of the revolving pinions 48 and 49 are such as to create a two to one ratio of both the reverse power output gear 46 and the direct output drive gear 47 to the rotatable housing 51 of the torque compensator 45. Therefore, as the torque compensator housing 51 is rotating at 200 RPM, the reverse power output gear and the direct output drive gear will be rotated at 400 RPM. From the foregoing, as the reverse power output gear 46 is rotated at 400 RPM, the transmission is designed to drive the fluid torque converter 60 at the same 400 RPM and thus in a one to one relationship with the reverse power output gear 46.

In the normal operation of the transmission of the present invention, as power is initially applied to the primary power input shaft 22 from the power source E, the torque will be reduced as it is transmitted through the sun gear 25, planetary pinion gears 26, and pinion gear 28 as such torque is conveyed to the intermediate power input shaft 30. The preferred reduction in torque being approximately four to one as previously described. At idling speeds, the load of the vehicle will normally prevent the drive shaft 55 from rotating and thus the overlapping pinions 48 and 49 carried by the torque compensator housing 45 will begin to rotate about the direct output drive gear 47. As the housing 51 continues to rotate, torque is transmitted through the reverse power output gear 46, through countershafts 61, to both the fluid torque converter 60 and the second torque compensator 70.

At low engine speeds, the torque transmitted to the fluid torque converter is insufficient to actuate or drive the turbine vanes 72 and thus the torque is absorbed within the fluid converter without imparting any drive energy to the secondary power input drive shaft 80. As the engine speed is increased, as for example to 1,200 RPM, the fluid torque converter receives sufficient energy input so that the impeller vanes 71 force the fluid within the converter against the turbine vanes 72 and stator wheel vanes 73, thereby causing the stator wheel to lock against the stator support tube by action of the roller clutch assembly. As the fluid is continued to be moved in the converter, the energy imparted to the turbine vanes 72 is directed to the secondary power input drive shaft 80 which surrounds and extends parallel to the primary power input shaft 22. As the hollow secondary input drive shaft rotates, energy will be transmitted to the housing 86 of the second torque compensator 70.

As the housing 86 of the second compensator unit is being driven in a clockwise fashion, as viewed from the left in FIG. 1, by driving engagement with the secondary input drive shaft 80, the annular driven gear 67 is being rotated in the same direction by the drive gears 63 mounted to the countershafts 61. As both the secondary power input drive shaft 80 and annular gear 67 are being driven in the same direction, the extension secondary power input shaft 95 will be forced to rotate in a like direction. However, as the second torque compensator unit has differential capabilities, the annular gear 67 and the secondary power input drive shaft 80 may be rotated at different speeds relative to one another. Therefore, if no torque is being applied through the fluid torque converter 60 to the housing 86 of the second torque compensator, the housing will still be driven through engagement with the annular gear 67. However, there is not resultant output to the intermediate power input shaft 95 as the housing 86 is freely rotating and driving the secondary power input drive shaft in a reverse manner back through the fluid torque converter. Again, however, as the fluid begins to transmit energy to the secondary power input shaft, the housing 86 is rotated thereby driving the intermediate power input shaft 95 and causing the rotatable housing 32 and ring gear 31 of the sun gear assembly S to be rotated.

As the fluid torque converter 60 begins driving the housing 32 of the sun gear assembly S, the ring gear 31 is moved in a clockwise direction as viewed from the left in FIG. 1. Prior to the fluid torque converter acting upon the housing 32, such housing has been maintained stationary by action of the one-way roller clutch 38 and fixed housing 39. However, as additional torque is added to the ring gear, pinions 26 will eventually rotate at the same speeds as the sun gear.

In standard automatic transmissions various sensing controls are utilized to shift the gearing arrangement within the transmission to compensate for increased loads on the vehicle drive shaft, such as when a vehicle encounters steep grades and the like. With the present transmission there is no shifting of the gears within the transmission. Rather, as an increased load is encountered, some slippage will be initiated between the impeller vanes and the turbine vanes of the fluid torque converter, and thus, the energy conveyed to the secondary input drive shaft 80 to the rotatable housing 86 of the second torque compensator 70 will be reduced. At the same time, power source E will be trying to maintain its performance and will continue rotating the reverse torque transmission system through reverse output gear 46 and countershafts 61 with torque compensators 45 and 70 functioning to provide mechanical relief for the power source under such load conditions.

As the turbine vanes of the fluid torque converter continue to slowdown under loaded conditions, the rotation of the ring gear housing 32 and ring gear 31 continues to be reduced. The ring gear 31 will eventually be driven at a lesser rate than the sun gear 25 thereby causing the planetary pinions 26 to begin freewheeling around the inside of the ring gear. Further, as power to the ring gear from the secondary power input shafts is reduced, the speed of rotation of the intermediate power input shaft 30, housing 51 and housing 86 will also be reduced.

In some conventional automatic transmissions, the torque converter is utilized to drive the entire transmission. However, in the present invention the fluid torque converter 60 acts to dampen the shock load placed on the transmission while it also serves to drive the ring gear 31 to provide additional torque therethrough to the intermediate power input shaft 30. During increased load conditions, the rotatable housing 86 of the second torque compensator 70 will slowdown in response to the secondary drive shaft 80. However, because of the second torque compensator 70, gear 67 will maintain a speed equal to that of the countershafts 61 while the extension drive shaft 95 will be forced to reduce speed to compensate for the reduced rate of rotation of the housing 86. The primary torque compensator 45 will operate in a similar manner permitting the drive shaft 55 to slowdown as the reverse output gear 46 continues to rotate to compensate for the reduction in speed of the rotatable housing 51 of the compensator. Therefore, as the engine creates torque by rotating the power input shaft 22, such torque is conveyed through sun gear assembly S to the intermediate power input shaft 30 which drivingly engages the torque compensator 45. In the torque compensator 45, torque is returned or redirected toward the fluid torque converter 60 through the countershafts 61. The fluid torque converter redirects the torque back along the outside of the primary power input shaft 22 through the secondary power input shaft 80, through the second torque compensator unit and to the intermediate power input shaft by way of ring gear housing 32 and ring gear 31. In this manner, the torque developed by the secondary power input train is added or conveyed to the vehicle drive shaft 55. From the foregoing it should be evident that the incoming torque transmitted through the primary power input shaft 22 makes a complete circuit through the transmission before such torque is conveyed to the drive shaft 55.

Generally, in a constant driving mode, fluid torque converter 60 adds additional torque through the secondary power input shafts so that the transmission operates in a one-to-one drive ratio between the input shaft 22 and drive shaft 55. When the transmission is in a one-to-one power mode, every component of the transmission system is moving in the same direction, simulating a single operating unit, with the exception of the gears driven by the two countershafts 61.

All driving situations, however, are not power modes. In a coasting situation where a vehicle is going downgrade or when stopping, the vehicle enters a drifting mode in which the engine output is retarded by the mechanical gear train between the engine and the vehicle drive wheels. In a drifting mode the torque coming from the wheels of the vehicle will be transmitted through the drive shaft 55 to the output drive gear 47 and housing 51 of the torque compensator assembly 45. As the housing 51 of the torque compensator 45 is connected to the primary power input shaft 22, a reverse load will be applied to the rotatable housing 32 of the ring gear assembly S causing the housing to reduce its rotational speed until it equals that of the engine speed. Further, since the output gear 47 is being driven by the vehicle momentum, in a drifting mode, either the housing 51 or the associated pinions 48 and 49 of the torque compensator assembly 45 must move relative to one another.

In a drifting mode situation, the momentum torque would either be directed against the primary power input shaft 22 or through the reverse output gear 67 to the fluid torque converter 60. To prevent this situation from developing, a standard roller clutch assembly 101 is installed to lock the drive shaft 55 and the housing 51 together whenever the vehicle is in a drifting mode so that all parts of the transmission will thereby rotate in the proper direction at all times.

Whenever the drive shaft 55 is exceeding the engine input speed, the rollers 102 associated with the roller clutch assembly 101 will lock the drive shaft 55 and hosuing 51 together causing the gears of the torque compensator 45 to be locked and move as a single unit. In addition, the cam 33 and rollers 35 associated with the sun gear assembly S will lock with race 36 so that the ring gear housing 32 and intermediate power input shaft 30 are locked to the primary power input shaft 22.

Since the torque compensator 45 is rotating as a single unit in a clockwise direction, viewed from the left in FIG. 1, when the venicle is in a drifting mode, the reverse output gear 46 will continue to drive the torque converter 60 through the connecting countershafts 61. Simultaneously, the hollow center or second torque compensator 70 is forced to rotate in a one-to-one driving ratio because its housing 86 is being driven by the secondary power input shaft 80 extending from the fluid torque converter 60.

When a vehicle is operated in a motionless state with the engine running, the power input shaft 22 will be driven by the engine at idling speed. Undesired transmission of torque to drive shaft 55 will be prevented as discussed in the preceding paragraphs as the fluid torque converter will absorb the low speed torque redirected thereto from the torque compensator 45. When it is desired to place the vehicle in a state of motion, the engine speed will be increased at which point the turbine vanes of the fluid torque converter will supply additional torque through the secondary parallel power input shaft to the sun gear housing and thereafter to the intermediate power input shaft 30 so that primary and secondary power inputs will be combined to supply driving energy to the vehicle drive shaft 55 through the torque compensator assembly 45.

I claim:

1. An automotive transmission for use in transmitting power between an engine and a drive shaft comprising a primary power input shaft means extended from the engine toward the drive shaft, and intermediate power input shaft means, torque increasing gear means connecting said intermediate power input shaft means to said primary power input shaft means, torque splitting gear means connected between said intermediate power input shaft means and the drive shaft, said torque splitting gear means having a reversely directed torque output means for directing at least a portion of the torque supplied to said torque splitting gear means toward said intermediate power input shaft means and a direct drive gear for transmitting torque to the drive shaft, a fluid torque converter means having a turbine driven power output means, reverse power transmitting gear means connecting said reversely directed torque output means to said fluid torque converter means, secondary power input shaft means connected between said output means of said fluid torque converter means and said torque increasing gear means, said secondary power input shaft means extending in a generally parallel relationship with said primary power input shaft means, wherein power from said secondary power input shaft means will be combined with power from said primary power input shaft means to drive said intermediate power input shaft means.

2. The invention of claim 1 in which said first torque increasing gear means includes a rotatable housing, sun gear means disposed within said housing and drivingly connected to said preliminary power input shaft means, planetary gear means drivingly engaged with said sun gear means, said planetary gear means being rotatably supported by carrier means connected to said intermediate power input shaft means, said planetary gear means drivingly engaging said rotatable housing and said rotatable housing being connected to said secondary power input shaft means.

3. The invention of claim 2 in which a first clutch means is disposed between said primary power input shaft means and said carrier means to thereby selectively lock said carrier means between said primary power input shaft means and said intermediate power input shaft means.

4. The invention of claims 2 or 3 including a stationary housing surrounding said rotatable housing, a second clutch means disposed between said rotatable housing and said stationary housing to thereby prevent said rotatable housing from rotating in a direction opposite to said primary power input shaft means.

5. The invention of claim 1 in which said torque splitting gear means includes a rotatable housing connected to said intermediate power input shaft means, planetary pinion gear means rotatably carried by said rotatable housing and connecting said reversely directed torque output means to said direct drive gear.

6. The invention of claim 5 including clutch means connecting said rotatable housing to the drive shaft, said clutch means locking said rotatable housing to the drive shaft when said drive shaft is rotating faster than said intermediate power input drive shaft means.

7. The invention of claim 1 in which said secondary power input shaft means includes a hollow center power input shaft disposed about said primary power input shaft means and drivingly connected between said fluid torque converter and a second torque splitting gear means, said second torque splitting gear means having a rotatable housing connected to said hollow center power input shaft, planetary pinion gear means carried by said rotatable housing, reverse power input gear means connecting said rotatable housing to said reversely directed torque output means and output means connecting said rotatable housing to an extended hollow power input shaft which connects said rotatable housing to said torque increasing gear means.

8. A planetary gear assembly for use in receiving first and second power source inputs from a primary torque input shaft and a secondary torque input shaft respectively to a torque output shaft and in which the planetary gear assembly is connected in axial alignment with said primary torque input shaft comprising a fixed housing, a first rotatable housing disposed within said fixed housing, ring gear means carried by said first rotatable housing, a sun gear means disposed within said first rotatable housing and drivingly engaged with the primary torque input shaft, a rotatable planetary ear housing disposed between said first rotatable housing and said sun gear means, a plurality of planetary gears carried by said planetary gear housing so as to be in driving engagement with both said sun gear means and said ring gear means, means to drivingly connected said first rotatable housing to said secondary torque input shaft, said planetary gear housing being drivingly connected to the torque output shaft and one-way clutch means mounted between said first rotatable housing and said fixed housing to lock said first rotatable housing from rotating in a reverse direction when no torque is supplied thereto from said secondary torque input shaft whereby the first and second power source inputs are transmitted through said planetary gear housing to said torque output shaft.

* * * * *